United States Patent
Sanaullah et al.

(10) Patent No.: US 10,732,987 B2
(45) Date of Patent: Aug. 4, 2020

(54) SYSTEM AND METHOD TO UPDATE OPERATING SYSTEM SERVICES

(71) Applicant: DELL PRODUCTS, LP, Round Rock, TX (US)

(72) Inventors: Abu Shaher Sanaullah, Austin, TX (US); Danilo O. Tan, Austin, TX (US); Srikanth Kondapi, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 15/972,901

(22) Filed: May 7, 2018

(65) Prior Publication Data

US 2019/0339987 A1 Nov. 7, 2019

(51) Int. Cl.
*G06F 9/4401* (2018.01)
*G06F 8/61* (2018.01)
*G06F 8/60* (2018.01)

(52) U.S. Cl.
CPC ............. *G06F 9/4411* (2013.01); *G06F 8/61* (2013.01); *G06F 8/62* (2013.01); *G06F 8/60* (2013.01); *G06F 9/4406* (2013.01)

(58) Field of Classification Search
CPC ...... G06F 9/4411; G06F 9/45558; G06F 8/61; G06F 8/62; G06F 8/65; H04L 67/10

USPC ........................................................ 717/178
See application file for complete search history.

(56) References Cited

U.S. PATENT DOCUMENTS

| 8,978,028 | B2 | 3/2015 | Flaming et al. | |
|---|---|---|---|---|
| 2005/0076196 | A1* | 4/2005 | Zimmer et al. | G06F 9/4411 713/1 |
| 2012/0036220 | A1* | 2/2012 | Dare et al. | G06F 8/61 709/217 |
| 2014/0359602 | A1* | 12/2014 | Sawaya et al. | G06F 8/61 717/176 |
| 2017/0364380 | A1 | 12/2017 | Fry, Jr. et al. | |

* cited by examiner

*Primary Examiner* — Wei Y Zhen
*Assistant Examiner* — Mohammed N Huda
(74) *Attorney, Agent, or Firm* — Larson Newman, LLP

(57) ABSTRACT

An information handling system includes a driver and a service. The driver is configured to determine if an operating system is not a restricted operating system, determine if corresponding service is present in response to determining the operating system is not a restricted operating system, and shut down the driver in response to determining the corresponding service is present. The service is configured to determine if a corresponding driver is present, and disable the corresponding driver in response to determining the corresponding driver is present.

14 Claims, 7 Drawing Sheets

SYSTEM AND METHOD TO UPDATE OPERATING SYSTEM SERVICES

FIELD OF THE DISCLOSURE

This disclosure generally relates to information handling systems, and more particularly relates to a system and method to update operating system services.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can include a variety of hardware and software components that can be configured to process, store, and communicate information and can include one or more computer systems, data storage systems, and networking systems.

SUMMARY

An information handling system can include a driver configured to determine if an operating system is not a restricted operating system; determine if corresponding service is present in response to determining the operating system is not a restricted operating system; and shut down the driver in response to determining the corresponding service is present. A service can be configured to determine if a corresponding driver is present, and disable the corresponding driver in response to determining the corresponding driver is present.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application. The teachings can also be utilized in other applications and with several different types of architectures such as distributed computing architectures, client/server architectures, or middleware server architectures and associated components.

Figure 1:
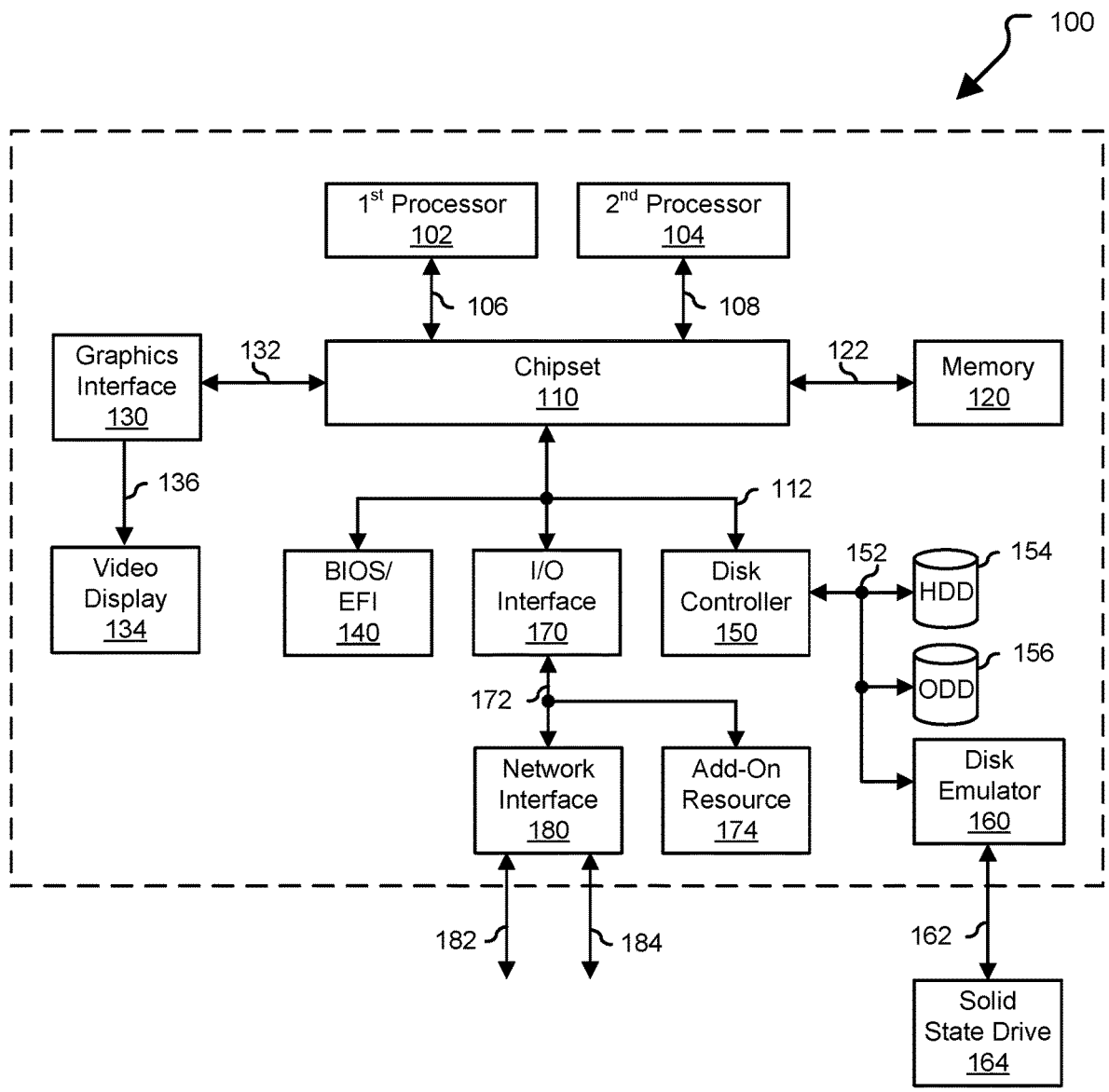
FIG. 1 is a block diagram of an information handling system according to one aspect of the disclosure.

FIG. 1 illustrates a generalized embodiment of information handling system 100. For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 can include devices or modules that embody one or more of the devices or modules described above, and operates to perform one or more of the methods described above. Information handling system 100 includes a processors 102 and 104, a chipset 110, a memory 120, a graphics interface 130, include a basic input and output system/extensible firmware interface (BIOS/EFI) module 140, a disk controller 150, a disk emulator 160, an input/output (I/O) interface 170, and a network interface 180. Processor 102 is connected to chipset 110 via processor interface 106, and processor 104 is connected to chipset 110 via processor interface 108. Memory 120 is connected to chipset 110 via a memory bus 122. Graphics interface 130 is connected to chipset 110 via a graphics interface 132, and provides a video display output 136 to a video display 134. In a particular embodiment, information handling system 100 includes separate memories that are dedicated to each of processors 102 and 104 via separate memory interfaces. An example of memory 120 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 140, disk controller 150, and I/O interface 170 are connected to chipset 110 via an I/O channel 112. An example of I/O channel 112 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 110 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/EFI module 140 includes BIOS/EFI code operable to detect resources within information handling system 100, to provide drivers for the resources, initialize the resources, and access the resources. BIOS/EFI module 140 includes code that operates to detect resources within information handling system 100, to provide drivers for the resources, to initialize the resources, and to access the resources.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits a solid-state drive 164 to be connected to information handling system 100 via an external interface 162. An example of external interface 162 includes a USB interface, an IEEE 1134 (Firewire) interface, a proprietary interface, or a combination thereof. Alternatively, solid-state drive 164 can be disposed within information handling system 100.

I/O interface 170 includes a peripheral interface 172 that connects the I/O interface to an add-on resource 174 and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a NIC disposed within information handling system 100, on a main circuit board of the information handling system, integrated onto another component such as chipset 110, in another suitable location, or a combination thereof. Network interface device 180 includes network channels 182 and 184 that provide interfaces to devices that are external to information handling system 100. In a particular embodiment, network channels 182 and 184 are of a different type than peripheral channel 172 and network interface 180 translates information from a format suitable to the peripheral channel to a format suitable to external devices. An example of network channels 182 and 184 includes InfiniBand channels, Fibre Channel channels, Gigabit Ethernet channels, proprietary channel architectures, or a combination thereof. Network channels 182 and 184 can be connected to external network resources (not illustrated). The network resource can include another information handling system, a data storage system, another network, a grid management system, another suitable resource, or a combination thereof.

The complexity of information handling systems can make them vulnerable to malicious activities. Network connected devices can be attacked remotely. Operating systems and software packages can include security flaws that leave them vulnerable to exploitation. Authorized users can be tricked into revealing access codes or running malicious software. Significant effort is expended in trying to secure systems from malicious activity, including training authorized users, identifying and patching security flaws in the software, and hardening network connections through the use of firewalls and the like. However, even with all these efforts, information handling systems continue to be exploited, due to lapses in user training, exploitation of unidentified or unpatched security flaws, and the like.

The execution of malicious code, either by user error or system compromise, continues to be a major source of security issues. For example, a user mistakenly executing ransomware can cause significant loss of data and business interruption when the ransomware encrypts critical data. Several techniques can be utilized to minimizing execution of malicious code. Antivirus software that scans code before it is allowed to execute can detect known threats but is often resource intensive and may not be able to identify novel threats. Notifying the user that code is of an unknown origin and requiring additional manual approvals can provide a reminder of the risks, but ultimately requires the user to make the correct decision. Additionally, with repeated manual approval, there is a tendency of users to just click through notifications.

Limiting activities that are outside of the normal operations can further reduce the risk of compromise. Code can be sandboxed to limit data access and/or access controls can be used to limit the actions that can be performed so that any malicious activity is limited in scope. In another example, the system may only allow execution of signed code that is known to be safe. For example, a system may only install software available through a curated online store where all the available software can be tested before it is made available. Additionally, the online store curator may impose limits on the available software, such as restricting what actions can be performed or which APIs can be used. Limiting users to software only available through a curated store and/or limiting the functions that can be performed by user installed code can cause issues with services that require interaction with hardware.

Figure 2:
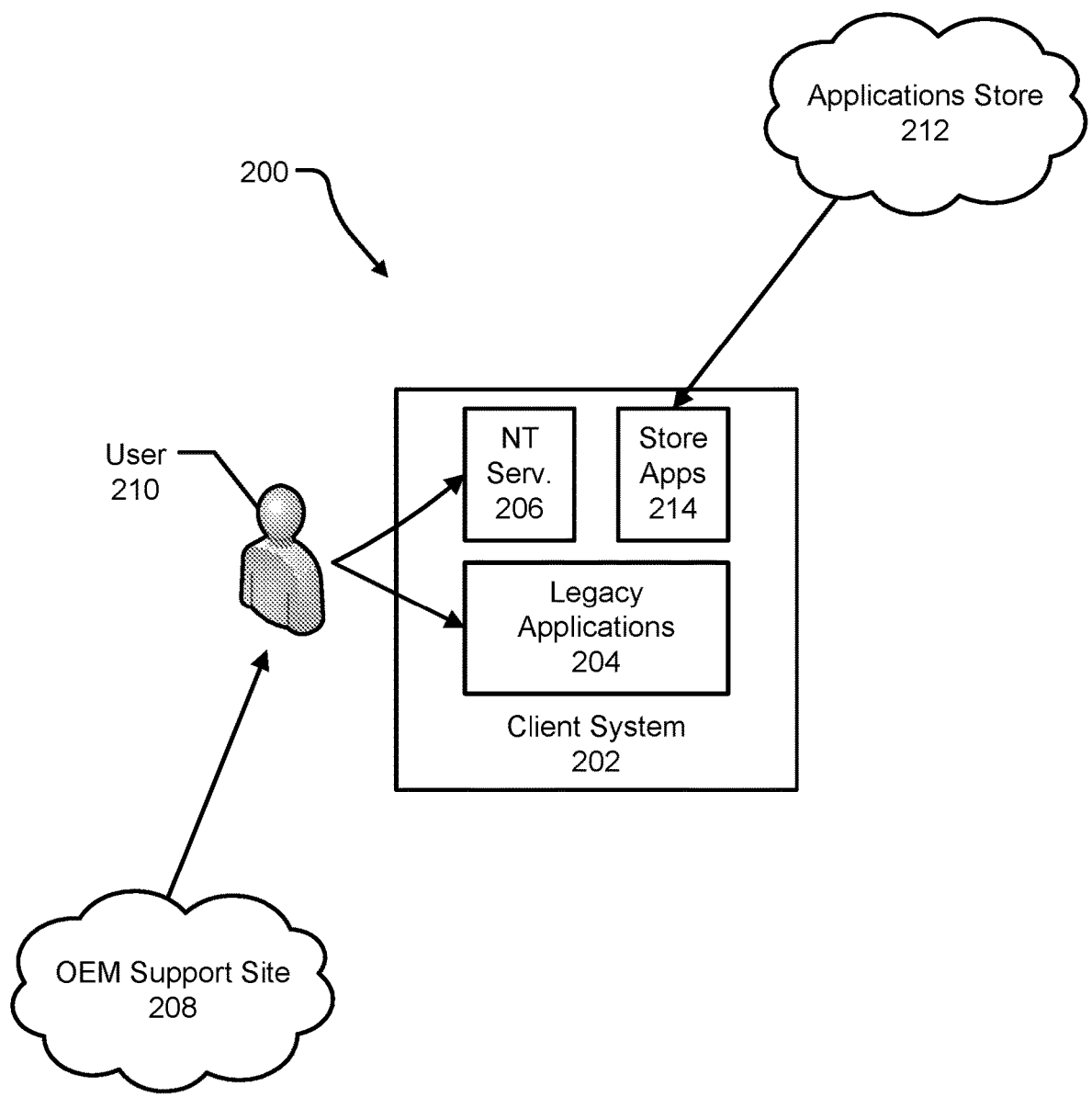
FIGS. 2 and 3 are block diagrams of methods for deploying applications and services according to aspects of the disclosure.

FIG. 2 shows mechanisms 200 of software deployment on a client system 202, such as information handling system 100. Traditionally, client system 202 can be shipped with software bundled by the Original Equipment Manufacturer (OEM). The bundled software can include legacy applications 204 and NT Services 206. In various embodiments, the legacy applications 204 and the NT Services 206 can work together to provide a customized experience for client system 202. For example, legacy applications 204 and NT services 206 can support configuration of power management features and other subsystems provided by the OEM. An OEM support site 208 can provide updates to bundled software and/or provide additionally legacy applications 204 and NT Services 206. For example, the OEM support site 208 can provide drivers and related applications for additional hardware that is installed or connected to client system 202 by a user 210. In some embodiments, user 210 may visit the OEM support site and download the latest updates. In some embodiments, an automatic update feature for the OEM software can be enabled, either automatically updating the software or by notifying the user when an update is available.

As another mechanism for software deployment, a curated application store 212 can be provided, such as by the operating system provider. Policies can limit what actions can be performed by applications available through the application store 212, and applications available can go through a screening process to ensure the policies are followed and that malicious code is not made available through the curated application store 212. Additionally, applications available through the application store 212 can be signed by the store provider to certify that the application is "safe". Store Applications 214 can be downloaded by client system, the signature can be checked, and the software functions made available. Additionally, auto update mechanisms may be enabled so that Store Applications 214 can be periodically updated (with or without user intervention) to ensure the latest software is installed.

In some embodiments, the operating system provider may limit the type of software that can be available in the application store 212. For example, software may be limited to the user level privileges and the applications may be sandboxed or virtualized so that interaction with data from other software and interaction with the system hardware is limited. In other embodiments, the software may be limited to a subset of allowable APIs.

Figure 3:
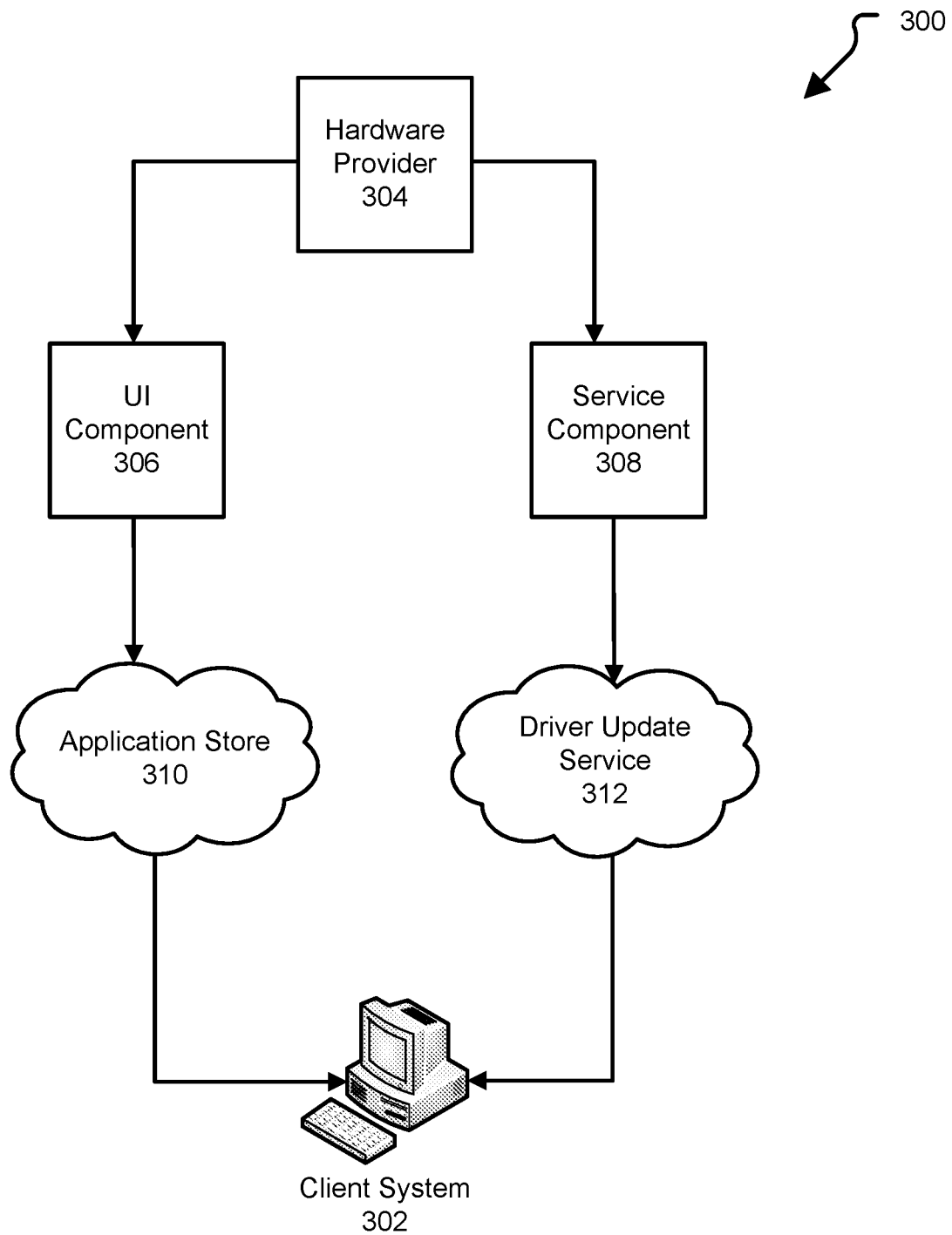

FIG. 3 shows a further mechanism 300 for installing software on a client system 302, such as information handling system 100. A hardware provider 304 can split the software into a user interface component 306 and a service component 308. The user interface component 306 can be compatible with the requirements of application store 310, and the service component 308 can be made available through a driver update service 312. Client system 302 can receive updates to the user interface component 306 through the application store 310 and updates to the service component through the driver update service 312.

In various embodiments, an application available through an application store can require a service component to be installed on the system for proper functioning. For example, the application can provide a user interface for configuring subsystems may not have the desired result if the service component is not available to make changes to the operation of the underlying hardware. However, ensuring compatible versions of both the application and the service component are installed can be problematic when splitting the service component and the application providing the user interface. For example, a user may go to the application store and obtain the user interface component and either not follow through or not be aware of the need to install the service component. In another example, the application may receive an update prior to the service component receiving the update. The out of date service component may cause the application to break or may prevent usage of new features of the application until the service component is updated.

Figure 4:
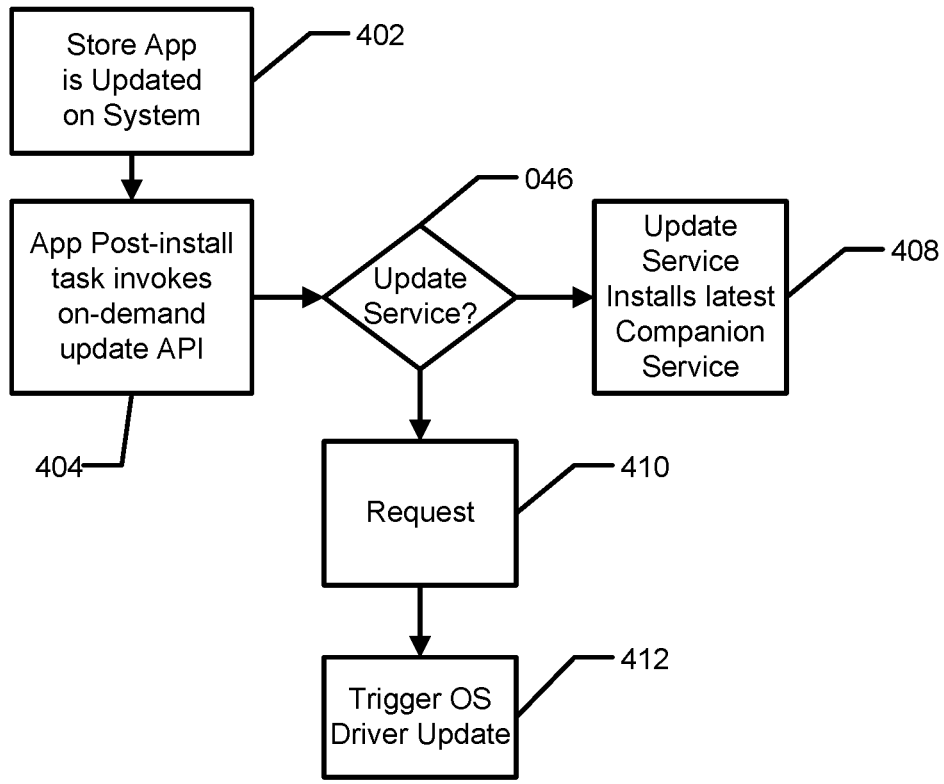
FIG. 4 is a flow diagram of a processes for updating a companion service after installing an application according to aspects of the disclosure.

One method to resolve the dependency issues it to invoke a process to install or update the service component when installing or updating the application. FIG. 4 is a flow diagram illustrating a method 400 of using a post install process to perform an on-demand install/update of a service component when an application is installed or updated. At 402, the store application is installed on the system. The store application can be a new application or an updated version of an already installed application. At 404, the application installer can perform a post-install task that invokes an on-demand update API on an update service. In various embodiments, the update service can be provided by the application developer. In particular embodiments, the application developer can be the OEM and the update service can come preinstalled on the system. The 406, it can be determined if the update service is installed on the system. For example, when the API is invoked, if the update service is installed, the API call can return a message indicating the update service performed the task. Alternatively, when the update service is not installed, the API call can return an error indicating the API or the service is unavailable.

When the update service is installed, the update service can retrieve the latest companion service component, such as from the application developer, and install the service component on the system, as indicated at 408.

Alternatively, when the update service is not installed, the application installer may rely upon an OS driver update mechanism. At 410, the application installer can make a call to a gateway service. The gateway service can use a hardware device ID mapping provided by the application to force the OS driver update mechanism perform an on-demand check updates to the required companion service component, as indicated at 412. Rather than waiting for the regularly scheduled update check of all components, the OS driver update mechanism can perform the check of only the companion service component. The OS driver update mechanism can then install the latest version of the companion service component.

In various embodiments, the companion service component installed through the OS driver update mechanism can have lesser functionality that the instance available through the update service, such as due to limitations imposed requirements for drivers available through the OS driver update mechanism.

In various embodiments, the operating system provider may provide multiple versions of an operating system. For example, a "basic" version, such as one suitable for embedded devices, handheld devices, and non-expert users, may limit software installation to only those applications and services provided by the application store and the driver update service. A "pro" version may be available for power users that may need access to more full featured applications and services, such as those that may not be available through the application store and the driver update service. Additionally, there may be an upgrade path between the basic version and the pro version such that a user can start with a basic version and then update to the pro version when the need arises without performing a complete reinstall of the operating system. When upgrading the to pro version, it may be desirable to update service components from the basic version available through the diver update service to a more full featured version that can be installed through an application developer or OEM provided support service.

Figure 5:
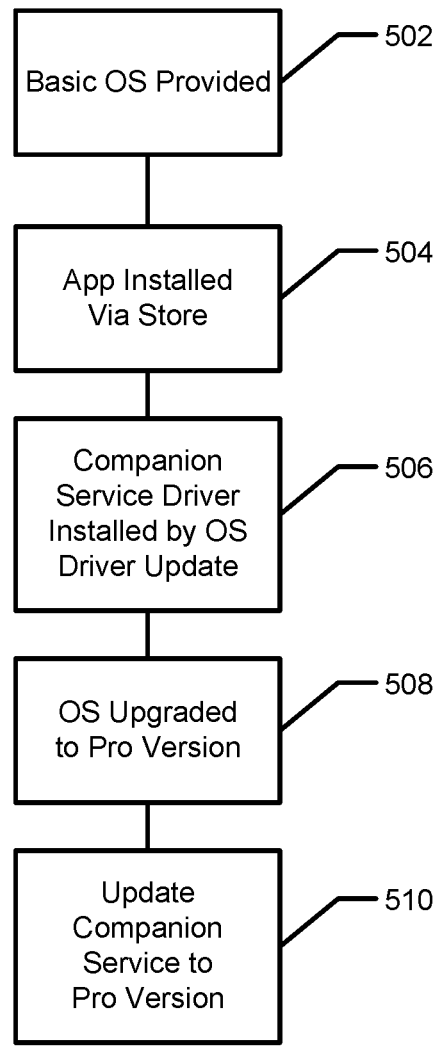
FIG. 5 is a flow diagram of a process for updating a companion service after upgrading an operating system according to aspects of the disclosure.

FIG. 5 illustrates an exemplary upgrade path 500. At 502, the system can be provided with a basic version of the operating system. At 504, a user may install an application. Since the basic version of the operating system can be limited to installing applications only through the application store, the application can be installed via the application store. At 506, a companion service component of the application can be install, such as through the OS driver update mechanism.

At 508, the user may determine the pro version of the operating system is needed, and may upgrade the system to the pro version. At 510, the companion service component can be updated to a pro-compatible full-featured version without the limitations imposed on the basic-compatible version of the companion service component.

In various embodiments, the basic-compatible version may be installed as a driver package, such as an extension INF, due to limitations imposed by the OS driver update mechanism and driver update service. The OS provider may limit the drivers available through the driver update service, such as by requiring the driver to be universal as required by Microsoft Windows 10. Since a universal driver may be installed on various types of systems, including mobile devices that do not support driver installation during runtime and install drivers on an offline image of the target system, the universal driver may not depend on the runtime behavior of the system and may not utilize any co-installers or other DLLs. Additionally, it may not be possible to uninstall the basic-compatible version of the companion service component without disabling the main top-level driver. Disabling the top-level driver during operation of the system can cause issues, such as system instability, temporary lost access to subsystems, and the like. To address these issues, the driver package and pro-compatible service component can coordinate operation until the driver package is uninstalled during a time when disabling the top level driver is unlikely to cause a disruption.

Figure 6:
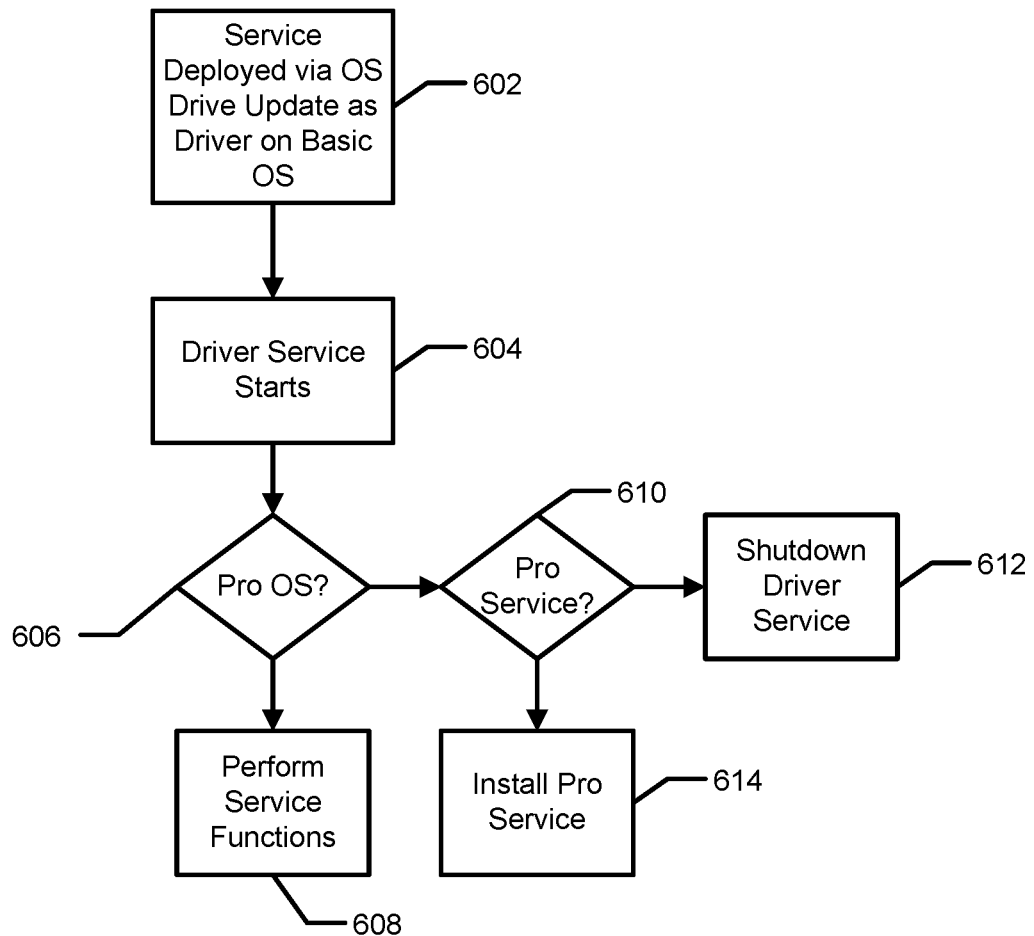
FIGS. 6 and 7 are flow diagrams of processes for coordination between a limited driver service and full-featured service to prevent conflict in accordance to aspects of the disclosure.

FIG. 6 shows a method 600 of operation of the driver service package to avoid interference with the pro service. At 602, the service can be deployed through the driver update as a driver extension. At 604, the driver extension can start, and at 606, the driver extension can determine if the operating system is the basic version. When the operating system is the basic version, the driver extension can perform the service functions needed by the application, as indicated at 608.

Alternatively, when the operating system is not the basic version, the driver extension can determine if the pro service is installed, such as checking if a pro flag is set, as indicated at 610. If the pro service is installed, the driver extension can shut down and cease operations to prevent conflicts with the pro service as indicated at 612. Alternatively, when the pro service is not installed, the driver extension can retrieve and install the pro version of the service component, as indicated at 614.

Figure 7:
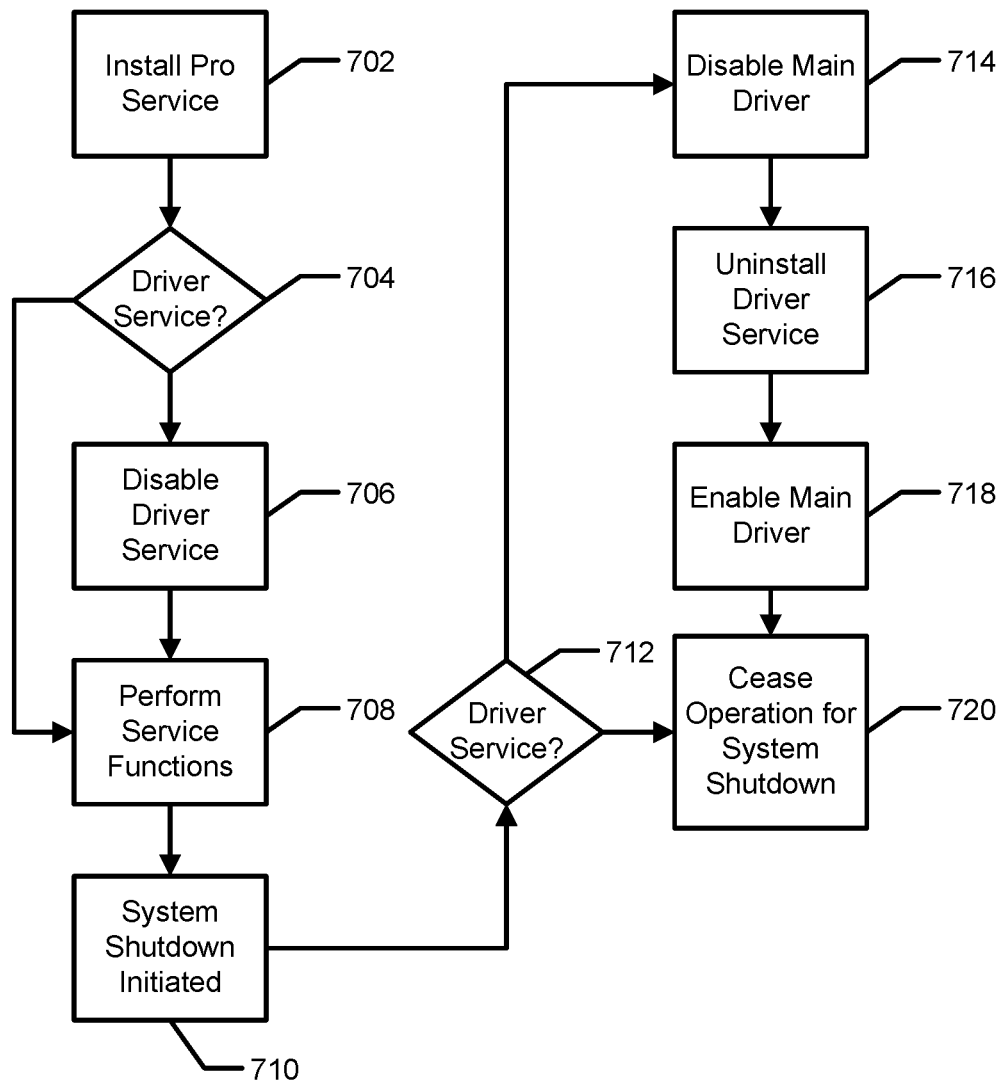

FIG. 7 shows a method 700 of operation of the pro version of the service component. At 702, the pro service component installer can provide an indication that the pro service is installed, such as by setting a pro flag. At 704, the installer can check if the driver service is present. If the driver service is present, the pro service can disable the driver service, as indicated at 706, and, at 708, can perform the service functions needed by the application. Alternatively, if the driver service is not present, the pro service can perform the service functions at 708 without disabling the driver service.

At 710, a shutdown sequence of the system can be initiated. At 712, the pro service can determine if the driver service is present. When the driver service is present, the pro service can disable the main driver as indicated at 714, uninstall the driver service as indicated at 716, and enable the main driver as indicated at 718. After uninstalling the driver service or after determining the driver service is not present, the pro service can cease operation in accordance with the shutdown sequence of the system, as indicated at 720.

The systems and methods disclosed improve computer-related technology. Limiting software available to be installed on and executed on an information handling system can significantly reduce the risk of malicious code execution, improving information security and privacy and reducing maintenance and support requirements. However, such limits can negatively impact the functioning of necessary software, such as system configuration tools. Providing a mechanism for the automatic installation of necessary services and/or drivers can avoid the requirement for additional user steps to install additional components for the proper operation of the application and reduce the chance of incompatible components crashing the software or otherwise limiting the functionality. Additionally, providing a path for upgrading driver extensions to services ensuring drivers and services do not conflict reduces system downtime that would otherwise be required to uninstall drivers and install services to replace the drivers.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
   an application configured to:
      provide a user interface for configuring a subsystem of the information handling system; and
      communicate with a service component to make changes to the operation of the underlying hardware;
   a driver being a basic version of the service component and configured to:
      determine if an operating system is not a restricted version of an operating system, the restricted version characterized by limits on the types of drivers and types of application that can be installed that are not present on other versions of the operating system;
      determine if a corresponding service is present in response to determining the operating system is not a restricted operating system, the service being a pro version of the service component; and
      shut down the driver in response to determining the corresponding service is present; and
   a service configured to:
      determine if a corresponding driver is present; and
      disable the corresponding driver in response to determining the corresponding driver is present.

2. The information handling system of claim 1, wherein the driver is deployed via an operating system driver update mechanism.

3. The information handling system of claim 1, wherein the service is deployed via an update service.

4. The information handling system of claim 1, wherein during a shutdown procedure the service is further configured to:

disable a main driver;
uninstall the driver; and
enable the main driver.

5. The information handling system of claim 1, wherein the driver is further configured to download and install the service in response to determining the corresponding service is not present.

6. The information handling system of claim 1, wherein the driver is a universal driver extension.

7. The information handling system of claim 1, wherein the driver has a reduced feature set compared to the service.

8. The information handling system of claim 1, wherein the service is further configured to set an indicator when it is installed, and the driver is configured to determine if corresponding service is present by checking the indicator.

9. A method comprising:
determining, by a driver, that an operating system is a non-restricted version of the operating system and a service is not installed, the driver being a basic version of a service component providing a set of functions for a restricted version of the operating system, the restricted version characterized by limits on the types of drivers and types of application that can be installed that are not present on other versions of the operating system, the service being a pro version of the service component and providing analogous functions and additional functions for a non-restricted version of the operating system, a software for configuring a subsystem including the service component and a user interface component;
downloading and installing the service in response to determining that the service is not installed;
detecting the service is installed by the driver and shutting down the driver to avoid conflicts with the service;
disabling the driver by the service when the driver is present;
providing a user interface for configuring a subsystem of the information handling system; and
communicating with a service component to make changes to the operation of the underlying hardware.

10. The method of claim 9, wherein the driver is a driver package with a reduced feature set compared to the service.

11. The method of claim 10, wherein the driver is a universal driver extension.

12. The method of claim 9, wherein the service further includes instructions for execution during a shutdown process of an information handling system that cause a processor to:
disabling disable a main driver;
uninstalling uninstall the driver; and
enabling enable the main driver.

13. The method of claim 9, further comprising setting an indicator when installing the service, and wherein determining the service is not installed includes checking the indicator.

14. The method of claim 9, wherein the downloading and installing the service includes invoking an on-demand update by an update service.

* * * * *